United States Patent
Chen et al.

(10) Patent No.: US 11,372,202 B2
(45) Date of Patent: Jun. 28, 2022

(54) SUPPORTING ELEMENT AND PORTABLE OPTICAL IMAGING LENS

(71) Applicant: GENIUS ELECTRONIC OPTICAL (XIAMEN) CO., LTD., Fujian (CN)

(72) Inventors: Wensen Chen, Fujian (CN); Ziping Li, Fujian (CN); Zhan Lin, Fujian (CN)

(73) Assignee: GENIUS ELECTRONIC OPTICAL (XIAMEN) CO., LTD., Xiamen (CN)

(*) Notice: Subject to any disclaimer, the term of this patent is extended or adjusted under 35 U.S.C. 154(b) by 278 days.

(21) Appl. No.: 16/662,031

(22) Filed: Oct. 24, 2019

(65) Prior Publication Data
US 2021/0055508 A1 Feb. 25, 2021

(30) Foreign Application Priority Data
Aug. 21, 2019 (CN) .......................... 201910771618.0

(51) Int. Cl.
G02B 13/00 (2006.01)
G02B 27/64 (2006.01)
G02B 9/34 (2006.01)
H04N 5/225 (2006.01)

(52) U.S. Cl.
CPC ............. *G02B 9/34* (2013.01); *G02B 13/001* (2013.01); *G02B 27/64* (2013.01); *H04N 5/2254* (2013.01)

(58) Field of Classification Search
CPC ........ G02B 9/34; G02B 13/001; G02B 27/64; G02B 27/0018; G02B 7/02; G02B 7/003; G02B 7/026; G02B 7/021; H04N 5/2254
See application file for complete search history.

(56) References Cited

U.S. PATENT DOCUMENTS

2015/0253532 A1* 9/2015 Lin .................. G02B 7/022
                                                          359/601
2018/0106983 A1* 4/2018 Tsai ................ G02B 5/005

FOREIGN PATENT DOCUMENTS

CN         203881963 U  * 10/2014  ......... G02B 27/0018
WO    WO-2019167001 A1 *  9/2019  ........... H04N 5/2254

* cited by examiner

*Primary Examiner* — Alicia M Harrington
(74) *Attorney, Agent, or Firm* — JCIPRNET

(57) ABSTRACT

Provided is a supporting element having an object-side mechanical surface, an image-side mechanical surface, an inner-side connecting surface having a first and a second plane inner walls extending from at least one of the object-side and the image-side mechanical surfaces, and an outer-side connecting surface having a first and a second outer cutting surfaces respectively adjacent to the first and the second plane inner walls. The supporting element satisfies the following conditional expression. 4≤R/SD≤30. R represents half of a distance between the first and the second outer cutting surfaces. SD represents a smaller one of a first and a second distances, the former being the minimum distance between the first outer cutting surface and the first plane inner wall, the latter being the minimum distance between the second outer cutting surface and the second plane inner wall. A portable optical imaging lens is also provided.

18 Claims, 10 Drawing Sheets

SUPPORTING ELEMENT AND PORTABLE OPTICAL IMAGING LENS

CROSS-REFERENCE TO RELATED APPLICATION

This application claims the priority benefit of China application serial no. 201910771618.0, filed on Aug. 21, 2019. The entirety of the above-mentioned patent application is hereby incorporated by reference herein and made a part of this specification.

BACKGROUND

Technical Field

The disclosure relates to a supporting element and a portable optical imaging lens using the supporting element.

Description of Related Art

In recent years, the specifications of portable electronic products have been evolving, and the size specifications of desired products are demanded to be lighter, thinner, shorter and smaller, wherein mechanical components (such as supporting elements) in a portable optical imaging lens have also become the target of improvement.

However, most of the conventional supporting elements only consider the trimming of their outer shape, and the degree of size reduction in the radial direction of the lens element is limited. Further, the inner-side connecting surface of the supporting element is perpendicular to the object-side mechanical surface or the image-side mechanical surface at 90 degrees, which is likely to cause unnecessary stray light. In addition, the thickness of the remaining part after trimming is thick, and the effect of size reduction is limited. If it is too thin, processing is difficult, and the structural strength of the element is also insufficient. Therefore, it is a major development key for persons skilled in the art to both reduce the size of the lens element and keep the processability of the supporting element as well as the image quality.

SUMMARY

The disclosure provides a supporting member with a reduced size in the radial direction and a sufficient structural strength to facilitate processing or assembly.

The disclosure provides a portable optical imaging lens with a reduced size in the radial direction and a good optical imaging quality.

An embodiment of the disclosure provides a supporting element, including an object-side mechanical surface facing toward an object side, an image-side mechanical surface facing toward an image side, an inner-side connecting surface, and an outer-side connecting surface. The inner-side connecting surface and the outer-side connecting surface connect the image-side mechanical surface and the object-side mechanical surface and respectively face toward an inside and an outside of the supporting element. At least one of the object-side mechanical surface and the image-side mechanical surface is configured to support a lens element. The inner-side connecting surface has a first plane inner wall and a second plane inner wall extending from at least one mechanical surface of the object-side mechanical surface and the image-side mechanical surface. The first plane inner wall is opposite to the second plane inner wall. The outer-side connecting surface has a first outer cutting surface and a second outer cutting surface opposite to each other. The first outer cutting surface is adjacent to the first plane inner wall, and the second outer cutting surface is adjacent to the second plane inner wall. The supporting element further satisfies the following conditional expression: $4.000 \leq R/SD \leq 30.000$, wherein R represents half of a distance between the first outer cutting surface and the second outer cutting surface. The minimum distance between the first outer cutting surface and the first plane inner wall is a first distance. The minimum distance between the second outer cutting surface and the second plane inner wall is a second distance. SD represents a smaller one of the first distance and the second distance.

An embodiment of the disclosure provides a portable optical imaging lens, including a lens barrel, a plurality of lens elements having refracting power, and the above supporting element. The lens elements are sequentially arranged along an optical axis from an object side to an image side and are disposed in the lens barrel. The supporting element is disposed in the lens barrel.

In an embodiment of the disclosure, the supporting element further satisfies the following conditional expression: $6.000 \leq R/SD \leq 27.000$.

In an embodiment of the disclosure, the first plane inner wall and the second plane inner wall of the inner-side connecting surface are inclined with respect to the object-side mechanical surface.

In an embodiment of the disclosure, a roughness of the above inner-side connecting surface is 0.200 microns or more.

In an embodiment of the disclosure, the supporting element further satisfies the following conditional expression: $4.000 \text{ mm} \leq D_t \leq 8.000 \text{ mm}$. $D_t$ is the distance between the first outer cutting surface and the second outer cutting surface.

In an embodiment of the disclosure, at least one of the image-side mechanical surface and the object-side mechanical surface has a stepped structure.

In an embodiment of the disclosure, a height difference of a step of the stepped structure is 0.020 mm or more.

In an embodiment of the disclosure, the inner-side connecting surface has the first plane inner wall and the second plane inner wall extending from the image-side mechanical surface.

In an embodiment of the disclosure, wherein the outer-side connecting surface further has at least one third outer cutting surface. The third outer cutting surface is located on one side of the first outer cutting surface and the second outer cutting surface.

In an embodiment of the disclosure, tops of the image-side mechanical surface and the object-side mechanical surface are planar.

In an embodiment of the disclosure, the supporting element further satisfies the following conditional expression:

$$D_{omax}/D_t < 0.900,$$

wherein the inner-side connecting surface defines a light passing hole for allowing an imaging ray to pass, an opening of the light passing hole toward the object side is an object-side light passing opening, $D_{omax}$ is the maximum diameter of the object-side light passing opening, and $D_t$ is the distance between the first outer cutting surface and the second outer cutting surface.

In an embodiment of the disclosure, the supporting element further satisfies the following conditional expression:

$$D_{omax}/D_{td} < 0.850,$$

wherein the inner-side connecting surface defines a light passing hole for allowing an imaging ray to pass, an opening of the light passing hole toward the object side is an object-side light passing opening, $D_{omax}$ is the maximum diameter of the object-side light passing opening, and $D_{td}$ is the maximum diameter of the outer-side connecting surface.

Based on the above, in the supporting element and the portable optical imaging lens of the embodiments of the disclosure, since the inner-side connecting surface has the first and the second plane inner walls extending from at least one mechanical surface of the object-side mechanical surface and the image-side mechanical surface, this design can achieve the effect of reducing the size of the optical imaging system in the radial direction. Further, since the supporting element and the portable optical imaging lens satisfy the conditional expression of 4.000≤R/SD≤30.000, they are advantageous for processing and have a sufficient structural strength without causing assembly difficulties.

In order to make the aforementioned features and advantages of the disclosure comprehensible, embodiments accompanied with drawings are described in detail below.

DESCRIPTION OF THE EMBODIMENTS

Figure 1:
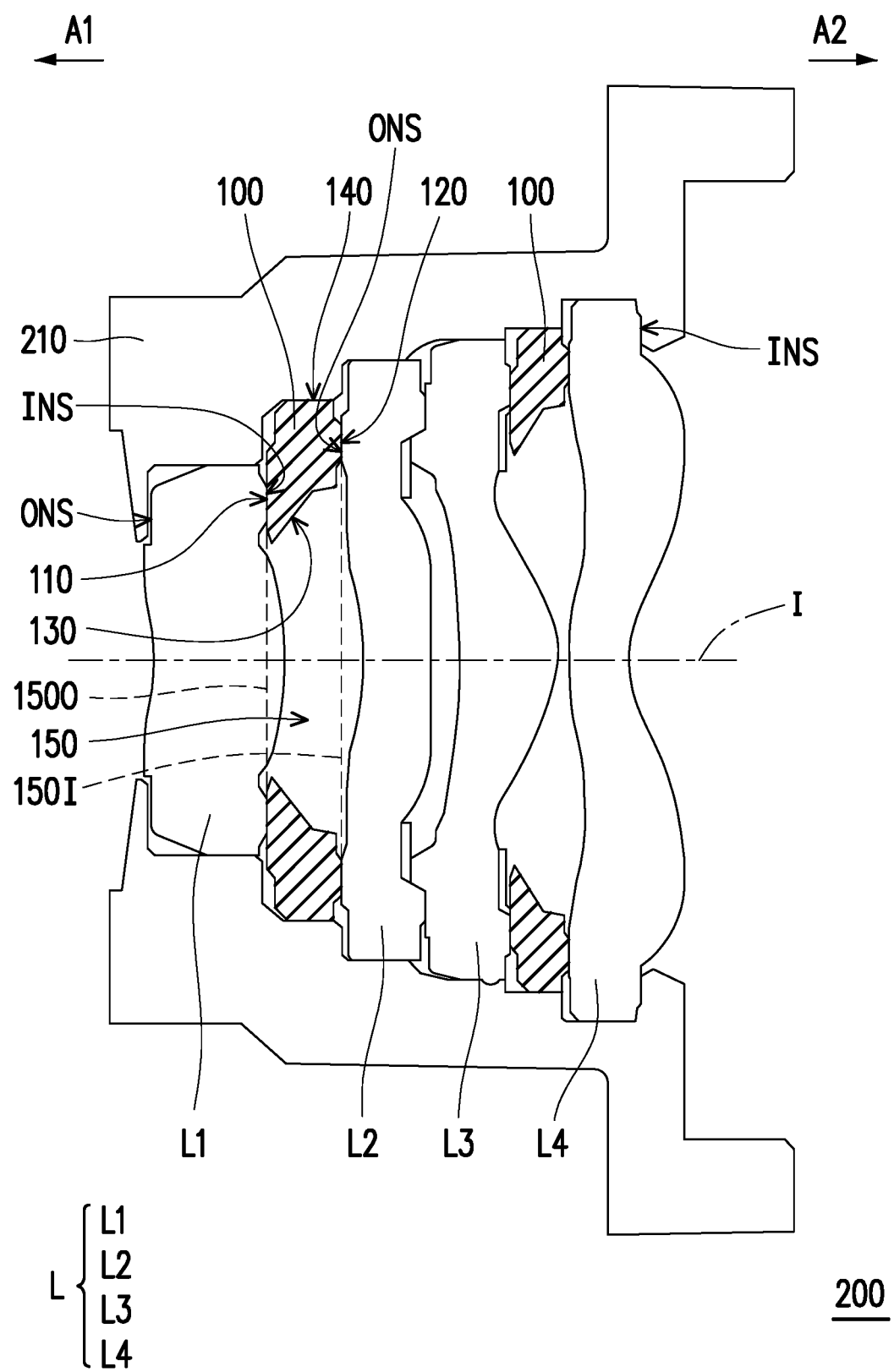
FIG. 1 is a schematic cross-sectional view of a portable optical imaging lens according to an embodiment of the disclosure.
Figure 2:
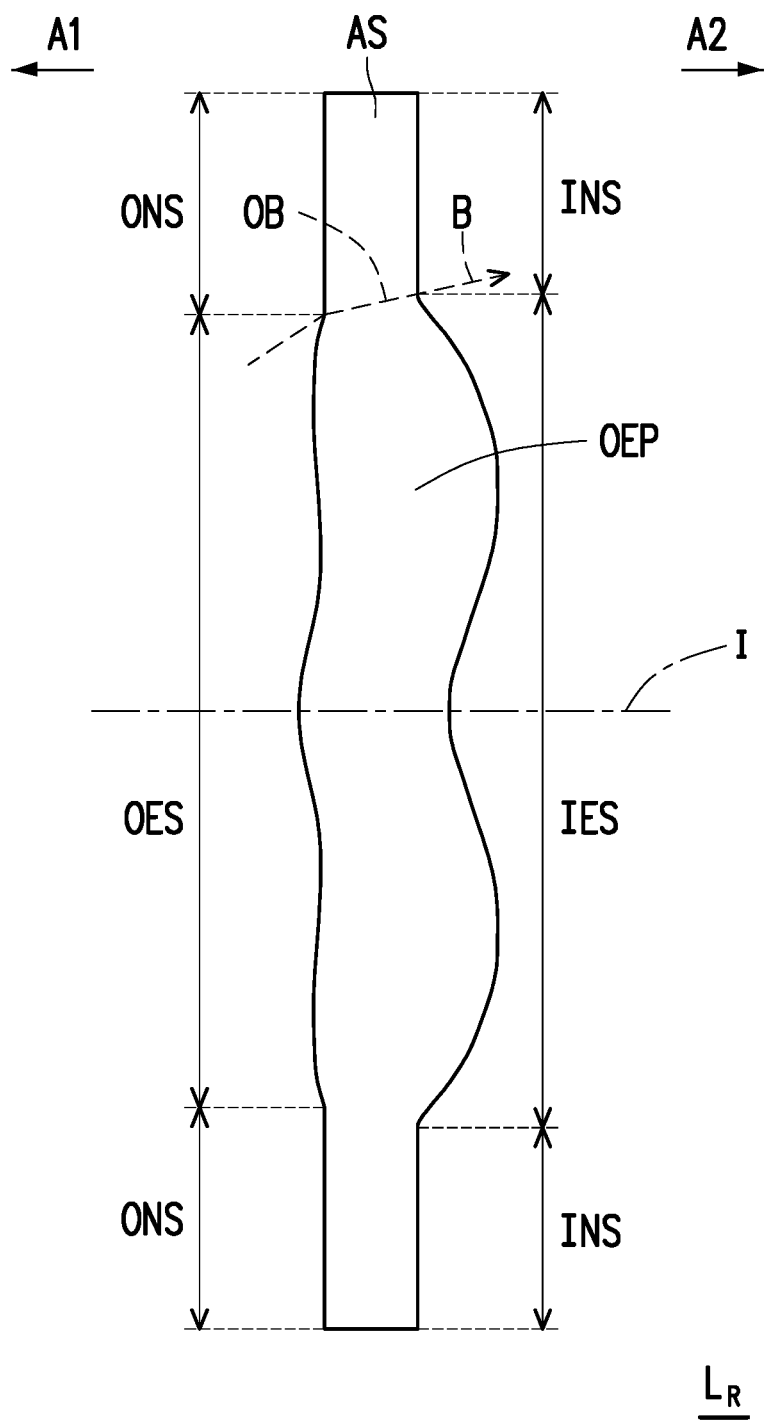
FIG. 2 is a schematic radial view of a reference lens element applicable to the portable optical imaging lens of FIG. 1.
Figure 3A:
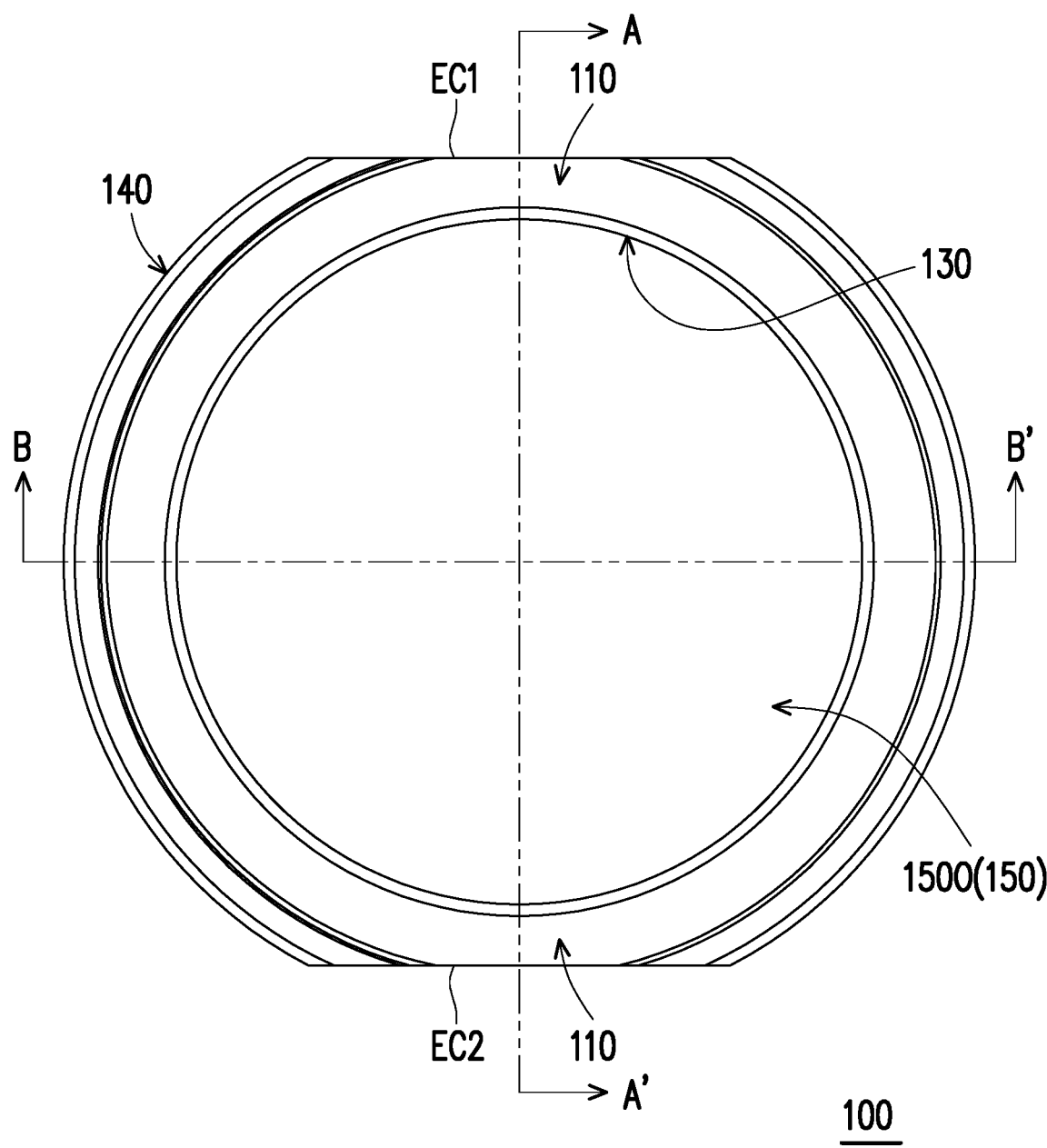
FIG. 3A is a schematic top view of an object-side mechanical surface of the supporting element of FIG. 1.
Figure 3B:
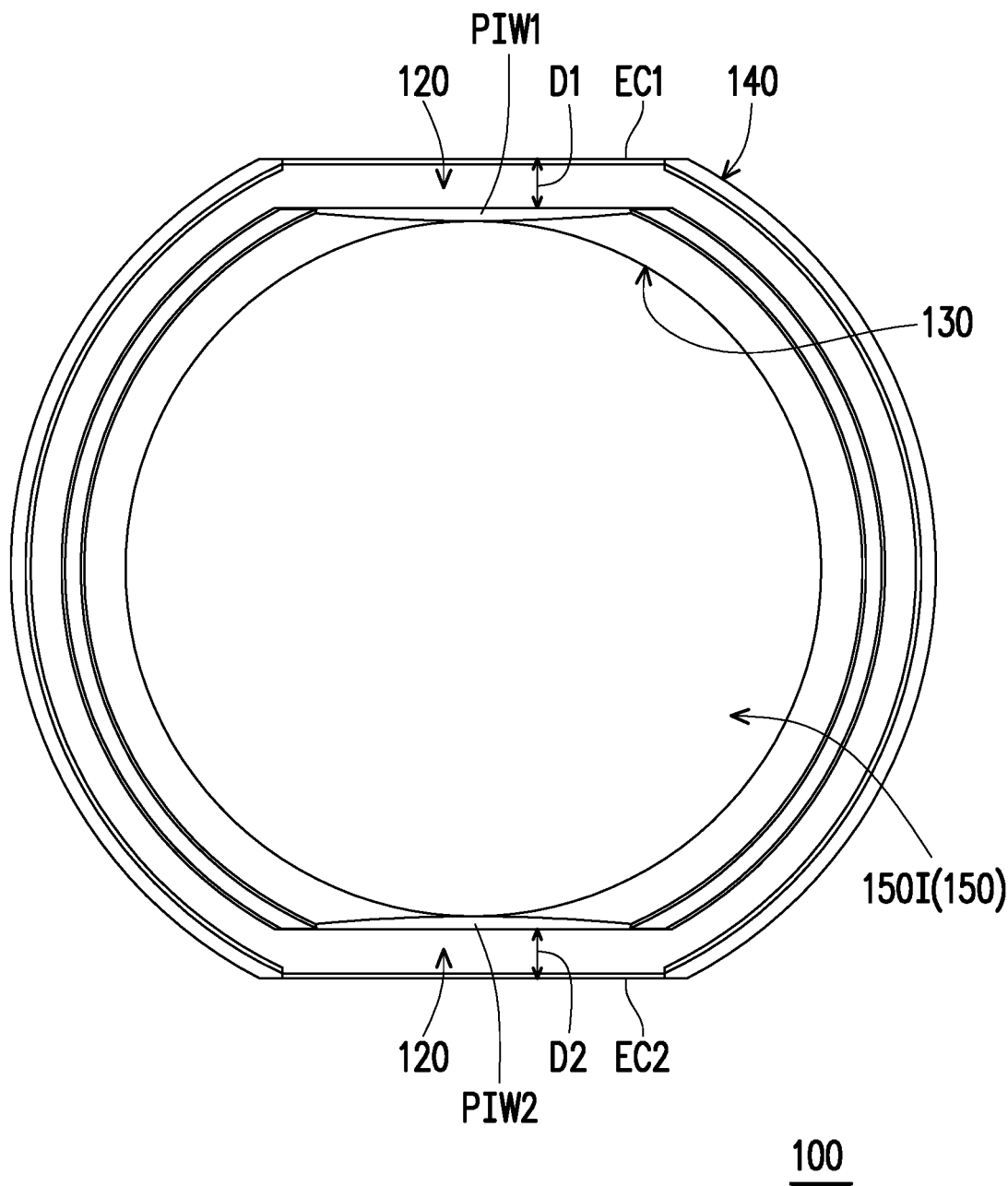
FIG. 3B is a schematic top view of an image-side mechanical surface of the supporting element of FIG. 1.
Figure 3C:
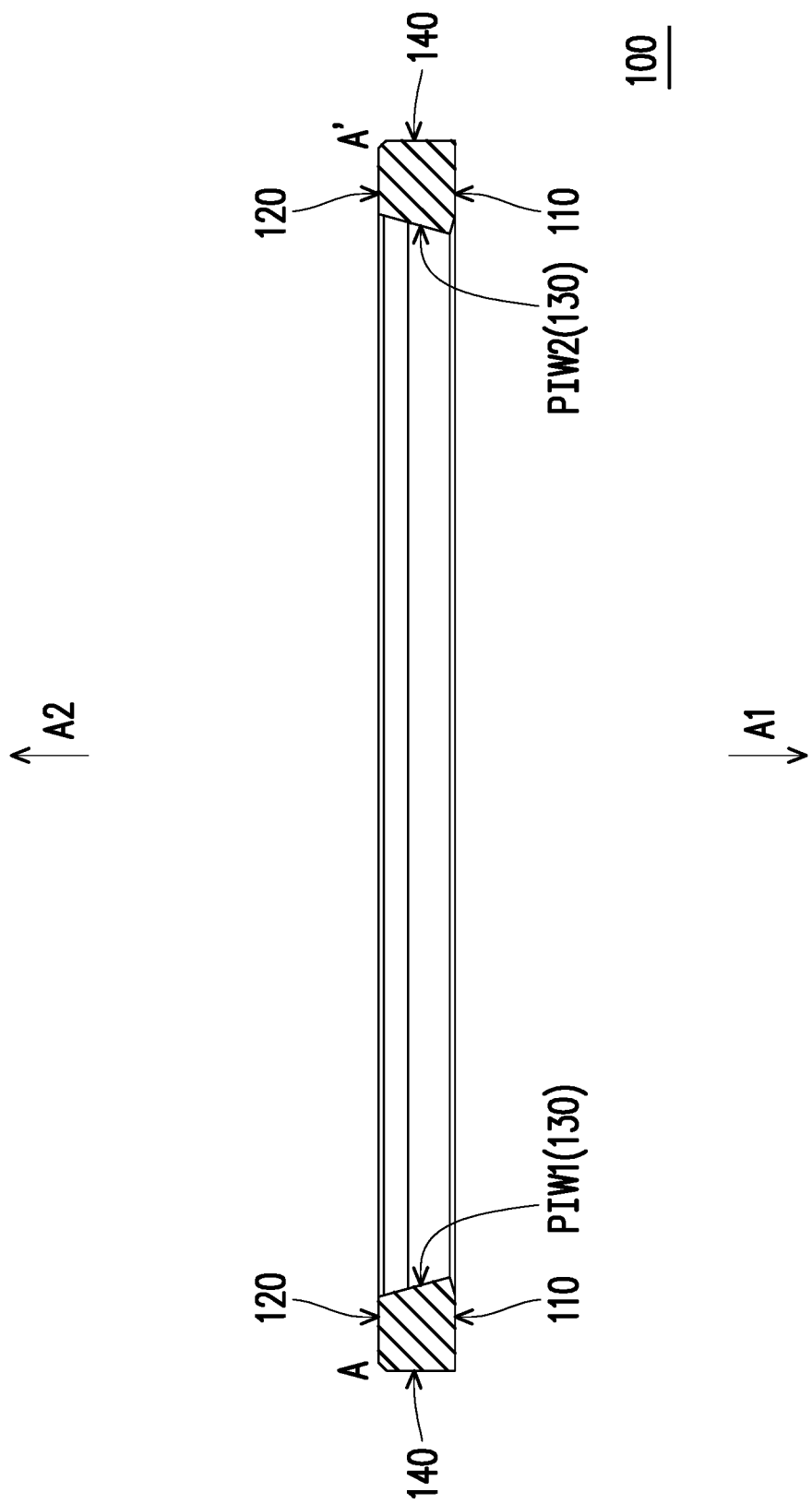
FIG. 3C is a schematic cross-sectional view of the section A-A' in FIG. 3A.
Figure 3D:
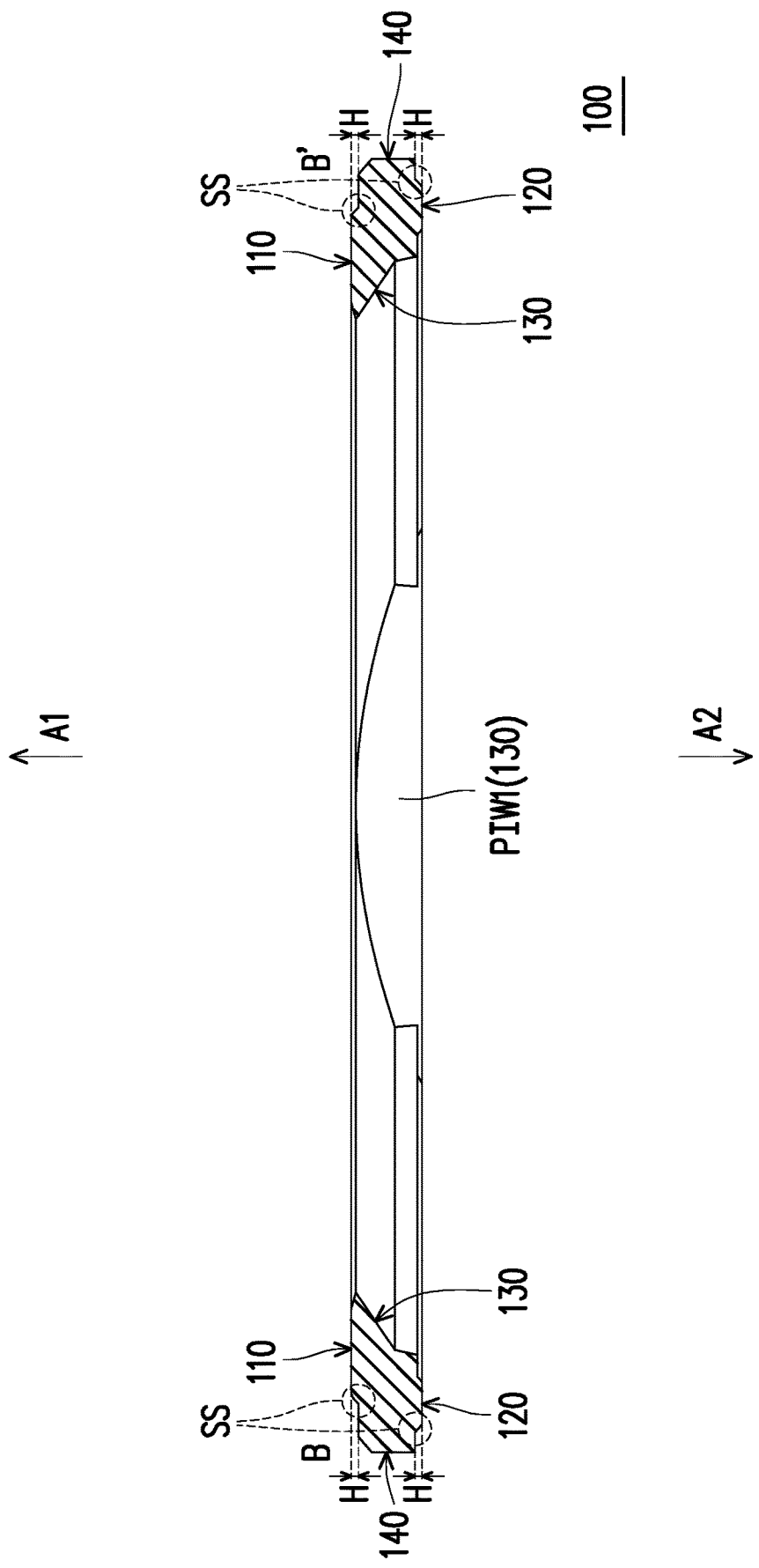
FIG. 3D is a schematic cross-sectional view of the section B-B' in FIG. 3A.

FIG. 1 is a schematic cross-sectional view of a portable optical imaging lens according to an embodiment of the disclosure. FIG. 2 is a schematic radial view of a reference lens element applicable to the portable optical imaging lens of FIG. 1. FIG. 3A is a schematic top view of an object-side mechanical surface of the supporting element of FIG. 1. FIG. 3B is a schematic top view of an image-side mechanical surface of the supporting element of FIG. 1. FIG. 3C is a schematic cross-sectional view of the section A-A' in FIG. 3A. FIG. 3D is a schematic cross-sectional of the section B-B' in FIG. 3A.

Referring to FIG. 1, in the embodiment, a portable optical imaging lens 200 can be applied to an imaging system such as a camera lens, a mobile phone lens, a telescope head and the like, and the disclosure is not limited thereto. The portable optical imaging lens 200 has an optical axis I, and includes a lens barrel 210, a plurality of lens elements L, and supporting elements 100. The number of the supporting elements 100 is, for example, two, but it is not limited thereto. The above elements will be described in detail in the following paragraphs.

The lens barrel 210 refers to an element for mounting the lens elements L, and has a function of protecting the lens elements L and the optical path inside the portable optical imaging lens 200.

Each of these lens elements L is, for example, an optical element having refracting power. In the embodiment, the portable optical imaging lens 200 includes, for example, four lens elements L1 to L4, or may include five, six, seven, or even eight or more lens elements. The number of the lens elements is merely an example, and the disclosure does not limit the number of the lens elements.

A reference lens element $L_R$ of FIG. 2 is taken as an example for describing the above lens elements L. In detail, each of the lens elements L can be divided into an optical effective portion OEP and an assembly portion AS depending on the functions. Referring to FIG. 2, the lens element $L_R$ can receive an imaging ray B that are incident on the portable optical imaging lens 200 over a set of angles ranging from parallel to the optical axis I to a half field of view (HFOV) angle with respect to the optical axis. The imaging ray B passes through the portable optical imaging lens 200 to produce an image on an image plane, and the optical effective portion OEP is defined by the imaging ray B. The optical effective portion OEP has an object-side optical effective surface OES toward an object side A1 and an image-side optical effective surface IES. In the embodiments of the disclosure, "the object-side optical effective surface OES (or the image-side optical effective surface IES) of the lens element $L_R$" is defined as a specific region of a surface on the object side A1 (or a surface on an image side A2) of the lens element at which the imaging ray B can pass through that specific region. Also, the lens element $L_R$ may further include an assembly portion AS extending radially outward from an optical boundary OB. The assembly portion AS is generally configured to assemble the lens element $L_R$ to the lens barrel 210. The imaging ray B does not reach the assembly portion AS, so the assembly portion AS may also be regarded as an optical ineffective portion in the lens element $L_R$. In the assembly portion AS, a surface facing toward the object side A1 is referred to as an object-side optical non-effective surface ONS, and a surface facing toward the image side A2 is referred to as an image-side optical non-effective surface INS, wherein the object-side optical non-effective surface ONS is connected to the object-side optical effective surface OES, and the image-side optical non-effective surface INS is connected to the image-side optical effective surface IES. The shape of the surfaces of the lens element $L_R$ in FIG. 2 is for illustrative purposes only and does not limit the scope of the disclosure.

The primary function of the supporting elements 100 is configured as elements for providing supporting forces to the lens elements L. The appearance design of the supporting elements 100 will be described in detail in the following paragraphs.

Referring to FIG. 1 and FIGS. 3A to 3D, in the embodiment, the supporting element 100 has an object-side mechanical surface 110, an image-side mechanical surface 120, an inner-side connecting surface 130, and an outer-side connecting surface 140. The object-side mechanical surface 110 and the image-side mechanical surface 120 face toward the object side A1 and the image side A2, respectively. Both the inner-side connecting surface 130 and the outer-side connecting surface 140 are connected to the object-side mechanical surface 110 and the image-side mechanical surface 120, wherein the inner-side connecting surface 130 faces toward an inside of the supporting element 100, and the outer-side connecting surface 140 faces toward an outside of the supporting element 100. Also, the inner-side connecting surface 130 defines a light passing hole 150 for allowing an imaging ray (not shown) to pass. An opening of the light passing hole 150 toward the object side A1 is an object-side light passing opening 150O. An opening of the light passing hole 150 toward the image side A2 is an image-side light passing opening 150I.

In the embodiments of the disclosure, the inner-side connecting surface 130 has a first plane inner wall PIW1 and a second plane inner wall PIW2 extending from at least one mechanical surface of the object-side mechanical surface 110 and the image-side mechanical surface 120. Referring to FIGS. 3A to 3D, the inner-side connecting surface 130 has the first plane inner wall PIW1 and the second plane inner wall PIW2 extending from the image-side mechanical surface 120 (as shown in FIG. 3B), and the inner-side connecting surface 130 does not have a first plane inner wall and a second plane inner wall extending from the object-side mechanical surface 110 (as shown in FIG. 3A). The outer-side connecting surface 140 has a first outer cutting surface EC1 and a second outer cutting surface EC2 opposite to each other. The first outer cutting surface EC1 is adjacent to the first plane inner wall PIW1, and the second outer cutting surface EC2 is adjacent to the second plane inner wall PIW2.

The disposition relationship between the above elements will be described in detail in the following paragraphs.

Referring to FIG. 1, in the embodiment, the lens elements L1 to L4 are sequentially arranged along the optical axis I from the object side A1 to the image side A2 and are disposed in the lens barrel 210. The supporting elements 100 are disposed in the lens barrel 210 and are in contact with the lens barrel 210. The object-side mechanical surface 110 and the image-side mechanical surface 120 of the supporting element 100 are respectively configured to support one of the lens elements L and are respectively configured to support, for example, the lens element L1 and the lens element L2, respectively. In detail, the lens element L1 is supported by the object-side mechanical surface 110 of the supporting element 100 on its image-side optical non-effective surface INS, and the lens element L2 is supported by the image-side mechanical surface 120 of the supporting element 100 on its object-side optical non-effective surface ONS. In other words, the two adjacent lens elements L1 and L2 are supported by the supporting element 100 such that a gap is maintained between the lens elements L1 and L2 in the direction along the optical axis I. That is, in addition to the function of supporting the lens elements L, the supporting element 100 has a function of spacing the two adjacent lens elements L1 and L2, and thus may also be regarded as a spacer element.

It should be noted that in the above embodiment, both the object-side mechanical surface 110 and the image-side mechanical surface 120 of the supporting element 100 are both configured to support the lens elements L. In other embodiments, only one of the object-side mechanical surface 110 and the image-side mechanical surface 120 of the supporting element 100 is configured to support a lens element; in other words, only one of the lens elements L is supported by the supporting element 100. For example, in an embodiment, the supporting element 100 may be disposed between the lens element L1 and the object side A1, and the object-side optical non-effective surface ONS of the lens element L1 may be supported by the image-side mechanical surface 120 of the supporting element 100. At this time, the object-side mechanical surface 110 of the supporting element 100 is not in contact with any of the lens elements. In another embodiment, the supporting element 100 may be disposed between the lens element L4 and the image side A2, and the image-side optical non-effective surface INS of the lens element L4 may be supported by the object-side mechanical surface 110 of the supporting element 100. That is, the object-side mechanical surface 110 and the image-side mechanical surface 120 of the supporting element 100 may selectively support the lens elements L. In other words, the object-side mechanical surface 110 and the image-side mechanical surface 120 may be a force-receiving surface, and may receive a force, for example, during assembly or when supporting the lens element, and are not necessarily both required to support a lens element in the finished product of the portable optical imaging lens 200. Furthermore, the supporting element 100 may also serve as a retainer, a light shield or a washer.

It should be noted that the following embodiments use part of the contents of the above embodiments, and the description of the same technical content is omitted. For the same reference numerals, reference may be made to the contents of the above embodiments, and the details are not repeated in the following embodiments.

Figure 4A:
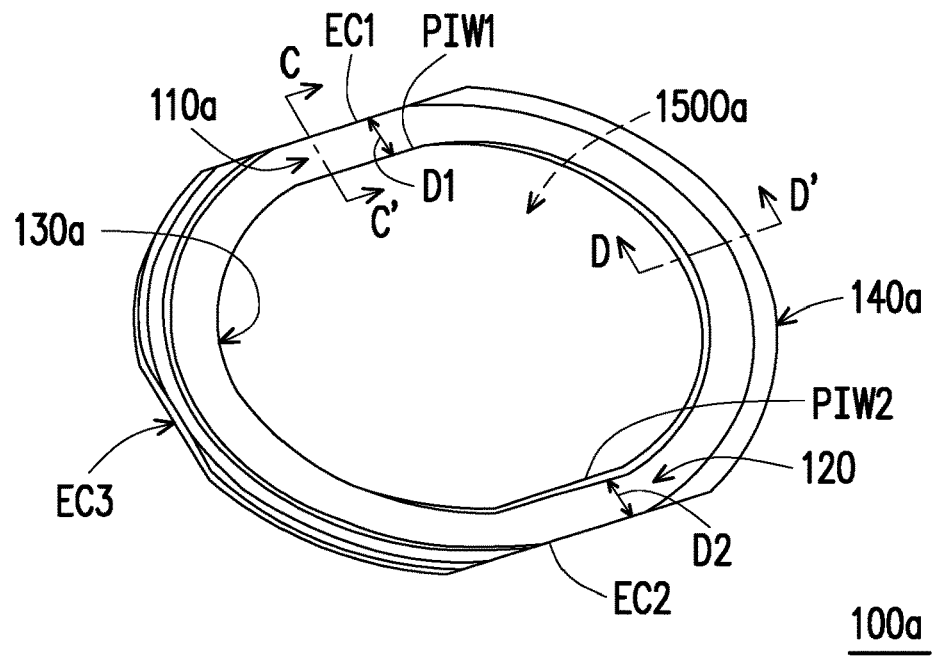
FIGS. 4A and 4B are schematic perspective views of the supporting element according to another embodiment of the disclosure viewed toward the object-side mechanical surface and the image-side mechanical surface, respectively.
Figure 4B:
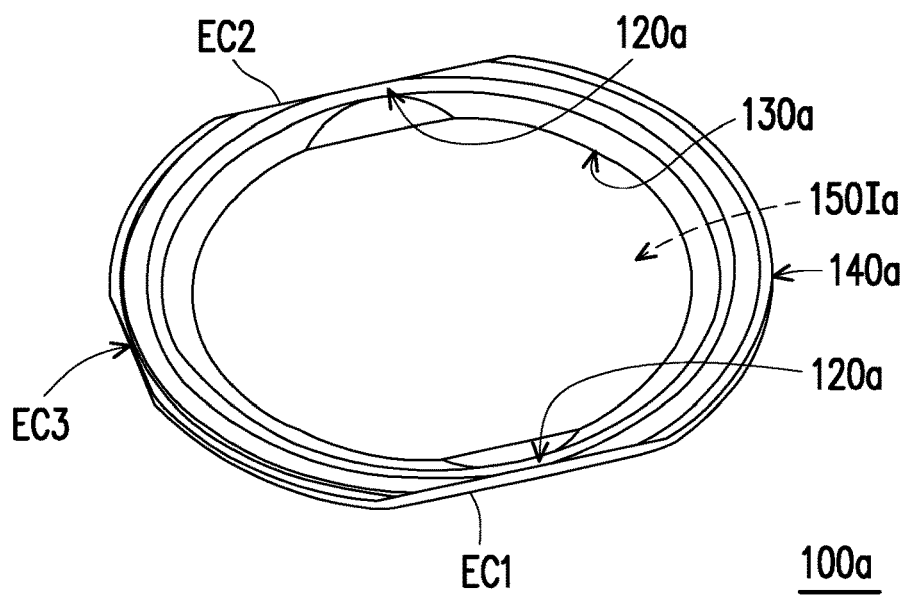
Figure 4C:
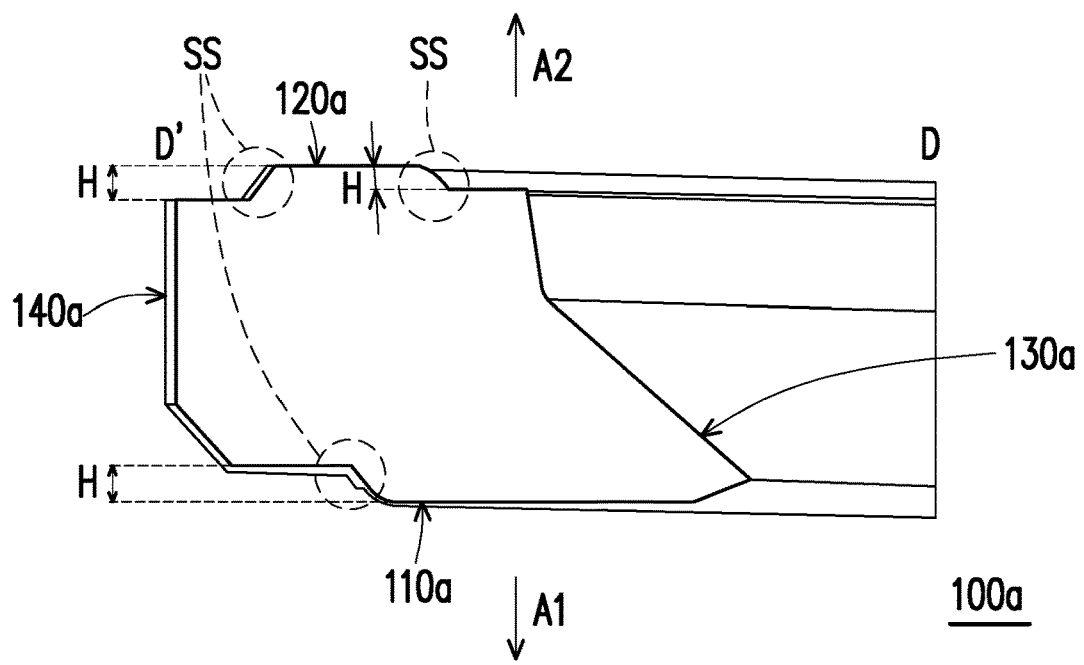
FIGS. 4C and 4D are schematic cross-sectional views of the sections D-D' and C-C' in FIG. 4A, respectively.
Figure 4D:
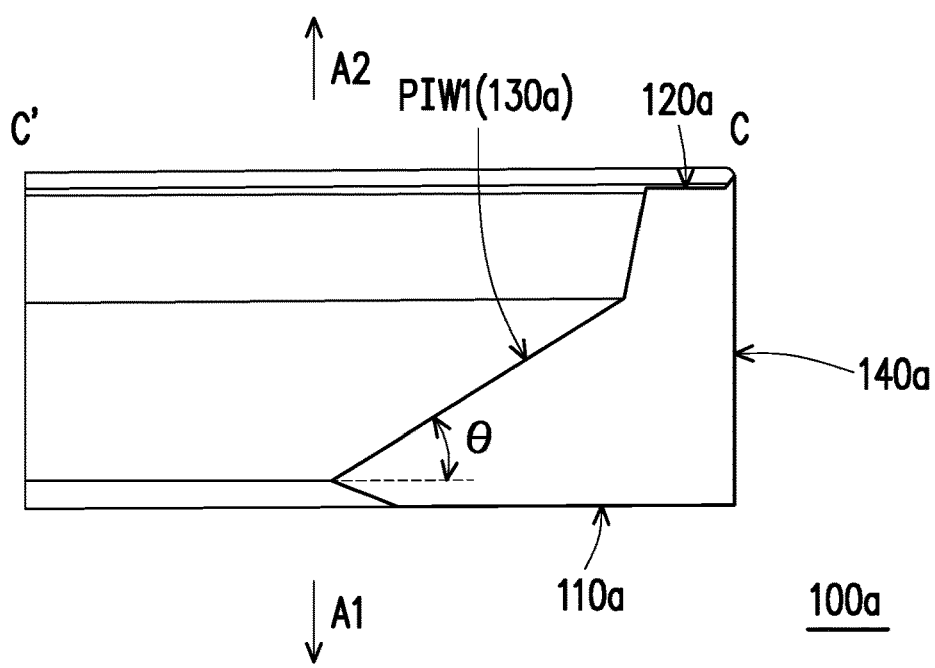

FIGS. 4A and 4B are schematic perspective views of the supporting element according to another embodiment of the disclosure viewed toward the object-side mechanical surface and the image-side mechanical surface, respectively. FIGS. 4C and 4D are schematic cross-sectional views of the sections D-D' and C-C' in FIG. 4A, respectively.

Referring to FIGS. 4A to 4D, the supporting element 100a is substantially similar to the supporting element 100 of FIGS. 3A and 3B, and the main difference lies in that in the supporting element 100a, the inner-side connecting surface 130a has the first plane inner wall PIW1 and the second plane inner wall PIW2 extending from the object-side mechanical surface 110a (as shown in FIG. 4A), and the inner-side connecting surface 130a does not have a first plane inner wall and a second plane inner wall extending from the image-side mechanical surface 120a (as shown in FIG. 4B), and the outer-side connecting surface 140a further has a third outer cutting surface EC3. The third outer cutting surface EC3 is different from the first and the second outer cutting surfaces EC1 and EC2, and is located on one side of the first outer cutting surface EC1 and the second outer cutting surface EC2.

Figure 5A:
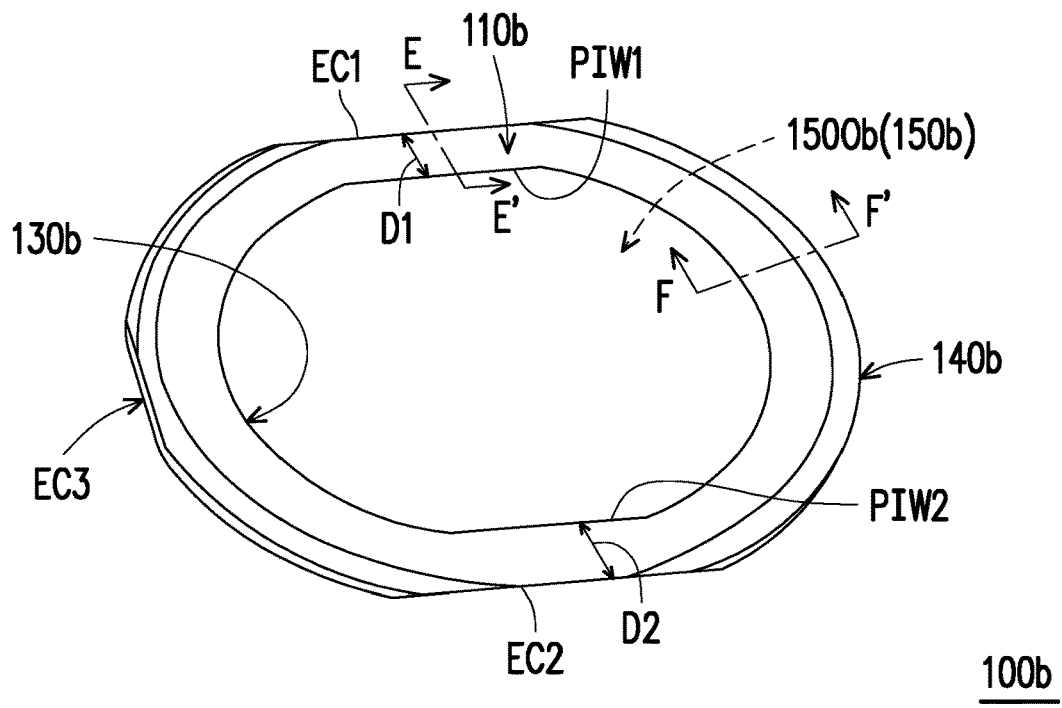
FIGS. 5A and 5B are schematic perspective views of the supporting element according to another embodiment of the disclosure viewed toward the object-side mechanical surface and the image-side mechanical surface, respectively.
Figure 5B:
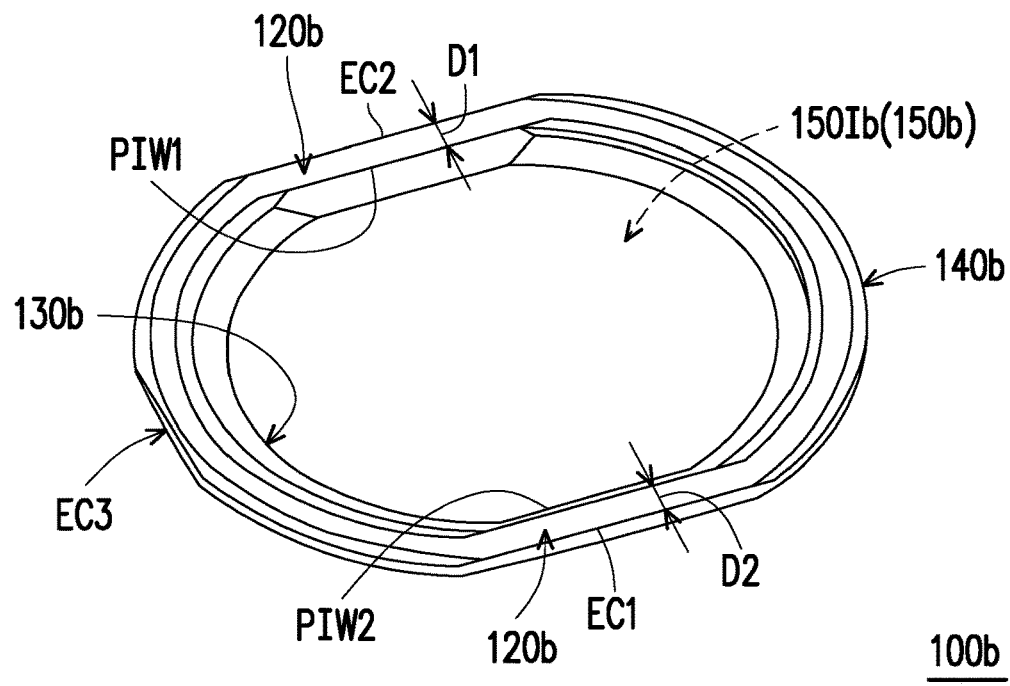
Figure 5C:
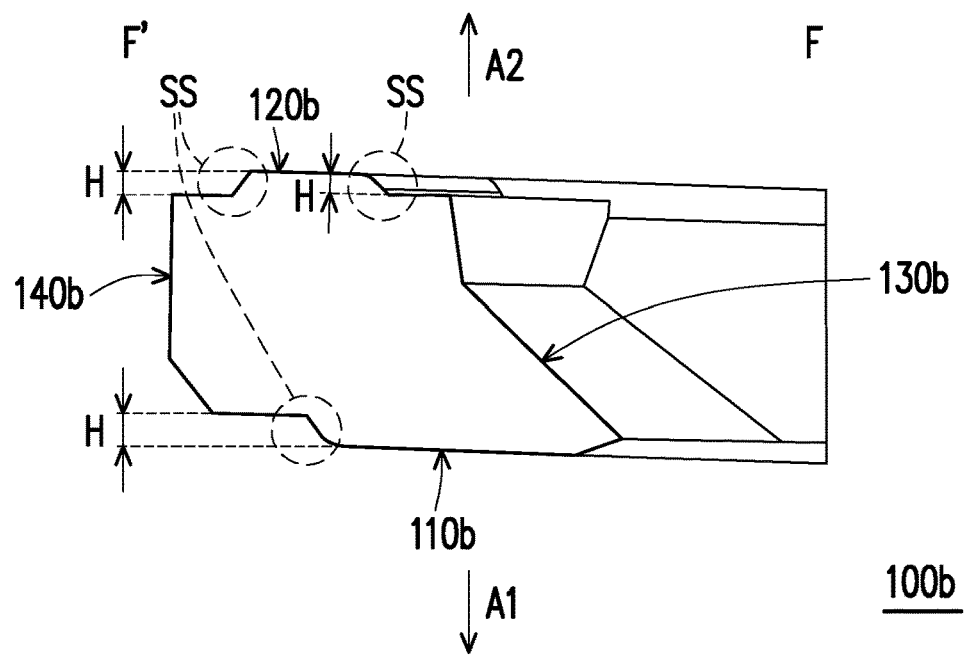
FIGS. 5C and 5D are schematic cross-sectional views of the sections F-F+ and E-E' in FIG. 5A, respectively.
Figure 5D:
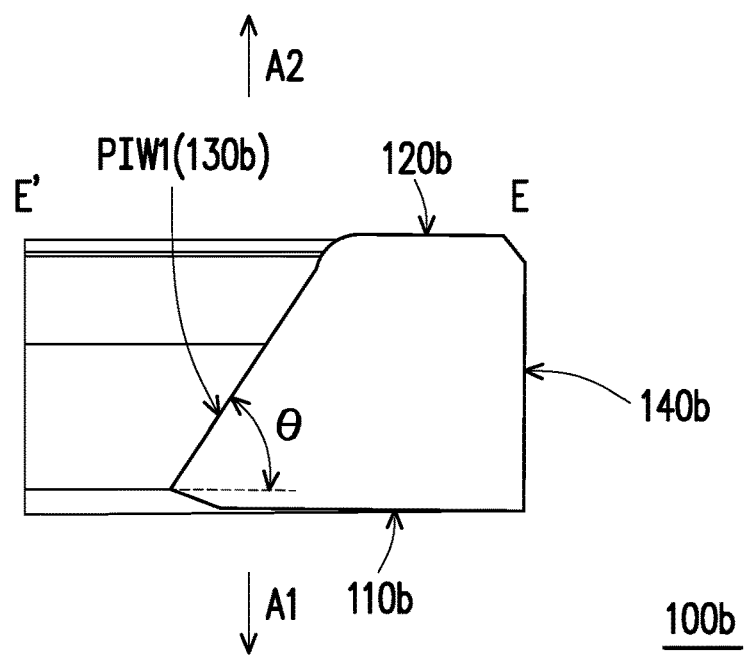

FIGS. 5A and 5B are schematic perspective views of the supporting element according to another embodiment of the disclosure viewed toward the object-side mechanical surface and the image-side mechanical surface, respectively. FIGS. 5C and 5D are schematic cross-sectional views of the sections F-F' and E-E' in FIG. 5A, respectively.

Referring to FIGS. 5A to 5D, the supporting element 100b is substantially similar to the supporting element 100 of FIGS. 3A and 3B, and the main difference lies in that in the supporting element 100b, the inner-side connecting surface 130b has the first plane inner wall PIW1 and the second plane inner wall PIW2 extending from the object-side mechanical surface 110b (as shown in FIG. 5A), and the inner-side connecting surface 130b also has the first plane inner wall PIW1 and the second plane inner wall PIW2 extending from the image-side mechanical surface 120b (as shown in FIG. 5B), and the outer-side connecting surface 140b further has a third outer cutting surface EC3. The third outer cutting surface EC3 is different from the first and the second outer cutting surfaces EC1 and EC2, and is located on one side of the first outer cutting surface EC1 and the second outer cutting surface EC2.

It should be noted that the portable optical imaging lens 200 in FIG. 1 adopts the supporting element 100 of FIGS. 3A to 3D. In other embodiments, the designs of the supporting element 100a of FIGS. 4A to 4D or the supporting element 100b of FIGS. 5A to 5D may be adopted.

According to the above, the supporting elements 100, 100a and 100b in the above embodiments of the disclosure further satisfy the following conditional expression: 4.000≤R/SD≤30.000, wherein R represents half of a distance between the first outer cutting surface EC1 and the second outer cutting surface EC2. The minimum distance between the first outer cutting surface EC1 and the first plane inner wall PIW1 is a first distance D1. The minimum distance between the second outer cutting surface EC2 and the second plane inner wall PIW2 is a second distance D2, and SD represents a smaller one of the first distance D1 and the second distance D2. Since the supporting elements 100, 100a and 100b satisfy the above conditional expression, they are advantageous for processing and have a sufficient structural strength without causing assembly difficulties. Preferably, the supporting elements 100, 100a and 100b may further satisfy 6.000≤R/SD≤27.000, whereby the corresponding light passing holes 150, 150a and 150b may be maintained at an appropriate size, and the corresponding object-side mechanical surfaces 110, 110a and 110b and image-side mechanical surfaces 120, 120a and 120b may have a sufficient space for supporting the lens elements L.

The material of the supporting elements 100, 100a and 100b in the above embodiments of the disclosure may be selected from a plastic material or a metal material. If a plastic material is used to manufacture the supporting elements 100, 100a and 100b, the required processing time is short, which facilitates mass production. If a metal material is used to manufacture the supporting elements 100, 100a and 100b, since a metal material has a stronger structural rigidity, it is less likely to be deformed and damaged during assembly.

In the supporting elements 100, 100a and 100b in the above embodiments of the disclosure, the inner-side connecting surfaces 130, 130a and 130b are inclined with respect to the object-side mechanical surfaces 110, 110a and 110b. That is, the angles θ between the inner-side connecting surfaces 130, 130a and 130b and the object-side mechanical surfaces 110, 110a and 110b are less than 90 degrees. With the above design, the supporting elements 100, 100a and 100b can maintain a proper gap between the lens elements in the portable optical imaging lens without hindering an imaging ray from producing an image on the image plane.

In the supporting elements 100, 100a and 100b in the above embodiments of the disclosure, the inner-side connecting surfaces 130, 130a and 130b may be processed by the following surface treatment methods, such as a sandblasting surface treatment or a laser engraving surface treatment. Alternatively, a threaded or serrated structure may be formed on the inner-side connecting surfaces 130, 130a and 130b. The inner-side connecting surface may be subject to different surface treatment methods as described above in response to different flare situations, such that the inner-side connecting surfaces 130, 130a and 130b have a surface roughness of at least 0.200 microns. Preferably, the surface roughness of the inner-side connecting surfaces 130, 130a and 130b may fall within a range of 0.200 microns to 2.000 microns.

In the supporting elements 100, 100a and 100b in the above embodiments of the disclosure, at least one of the object-side mechanical surface 110 and the image-side mechanical surface 120 has a stepped structure SS. With the design of the stepped structure SS, together with the shapes of the object-side optical non-effective surface ONS and the image-side optical non-effective surface INS of the lens elements L, it is advantageous for the lens elements L to be supported by or fitted to the supporting elements 100, 100a and 100b, and it can also alleviate the deformation of the elements under force.

Further to the above, a step of the stepped structure SS has a height difference H, and the height difference H is designed to be 0.020 mm or more. Preferably, the height difference H may fall within a range of 0.020 mm to 0.050 mm. By designing the height difference H to be 0.020 mm or more, it is possible to prevent the material burrs generated by the processing from being higher than the object-side mechanical surfaces 110, 110a and 110b or the image-side mechanical surfaces 120, 120a and 120b, thereby affecting the support effect of the lens elements L.

In the supporting element 100 in the above embodiments of the disclosure, the inner-side connecting surface 130 has the first plane inner wall PIW1 and the second plane inner wall PIW2 extending from the image-side mechanical surface 120, and according to this design, the size of the portable optical imaging lens 200 in the radial direction can be reduced.

In the supporting elements 100a and 100b in the above embodiments of the disclosure, the outer-side connecting surfaces 140a and 140b further have at least one third outer cutting surface EC3. The third outer cutting surface EC3 is different from the first and the second outer cutting surfaces EC1 and EC2, and is located on one side of the first outer cutting surface EC1 and the second outer cutting surface EC2. The above-mentioned trimming design of the supporting elements 100a and 100b can be matched with the trimming of the lens elements L to achieve the effect of further size reduction. Alternatively, the third outer cutting surface EC3 may be used to identify the front and back surfaces of the supporting elements 100a and 100b.

The supporting elements 100, 100a and 100b in the above embodiments of the disclosure may further satisfy the following conditional expression:

$$D_{omax}/D_t<0.900,$$

wherein $D_{omax}$ is the maximum diameter of the object-side light passing openings 150O, 150Oa and 150Ob, and $D_t$ is a distance between the first outer cutting surface EC1 and the second outer cutting surface EC2. With the above design, the object-side mechanical surfaces 110, 110a and 110b of the supporting elements 100, 100a and 100b have a sufficient supporting space.

The supporting elements 100, 100a and 100b in the above embodiments of the disclosure may further satisfy the following conditional expression:

$$4.000 \text{ mm} \leq D_t \leq 8.000 \text{ mm},$$

wherein $D_t$ is the distance between the first outer cutting surface EC1 and the second outer cutting surface EC2, wherein if $D_t$ is greater than 8 mm, the supporting element may be too thick to meet the requirements of being light, thin, short and small. If $D_t$ is less than 4.000 mm, the design specifications of the large image height cannot be achieved.

Therefore, designing $D_t$ to be within the above length range can avoid the above problems.

The supporting elements 100, 100*a* and 100*b* in the above embodiments of the disclosure may further satisfy the following conditional expression:

$$D_{omax}/D_{td}<0.850,$$

wherein $D_{omax}$ is the maximum diameter of the object-side light passing openings 150O, 150Oa and 150Ob, and $D_{td}$ is the maximum diameter of the outer-side connecting surfaces 140, 140*a* and 140*b*. With the above design, the object-side mechanical surfaces 110, 110*a* and 110*b* of the supporting elements 100, 100*a* and 100*b* have a sufficient supporting space to achieve the function of maintaining the gap between the lens elements L.

In the supporting elements 100, 100*a* and 100*b* in the above embodiments of the disclosure, the tops of the object-side mechanical surfaces 110, 110*a* and 110*b* and the image-side mechanical surfaces 120, 120*a* and 120*b* are, for example, planar, and according to this design, the supporting elements 100, 100*a* and 100*b* can be easily processed.

In summary, in the supporting element and the portable optical imaging lens of the embodiments of the disclosure, since the inner-side connecting surface has the first and the second plane inner walls extending from at least one mechanical surface of the object-side mechanical surface and the image-side mechanical surface, this design can achieve the effect of reducing the size of the optical imaging system in the radial direction. Further, since the supporting element and the portable optical imaging lens satisfy the conditional expression of $4.000 \leq R/SD \leq 30.000$, they are advantageous for processing and have a sufficient structural strength without causing assembly difficulties.

Although the disclosure has been described with reference to the above embodiments, they are not intended to limit the disclosure. It will be apparent to persons of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A supporting element of a portable optical imaging lens, comprising:
    an object-side mechanical surface facing toward an object side;
    an image-side mechanical surface facing toward an image side;
    an inner-side connecting surface; and
    an outer-side connecting surface, wherein the inner-side connecting surface and the outer-side connecting surface connect the image-side mechanical surface and the object-side mechanical surface and respectively face toward an inside and an outside of the supporting element, and at least one of the object-side mechanical surface and the image-side mechanical surface is configured to support a lens element,
    wherein the inner-side connecting surface has a first plane inner wall and a second plane inner wall extending from at least one mechanical surface of the object-side mechanical surface and the image-side mechanical surface, and the first plane inner wall is opposite to the second plane inner wall,
    wherein the outer-side connecting surface has a first outer cutting surface and a second outer cutting surface opposite to each other, the first outer cutting surface is adjacent to the first plane inner wall, and the second outer cutting surface is adjacent to the second plane inner wall,
    wherein the supporting element further satisfies the following conditional expressions:
    $4.000 \leq R/SD \leq 30.000$ and $4.000 \text{ mm} \leq D_t \leq 8.000 \text{ mm}$,
    wherein R represents half of a distance between the first outer cutting surface and the second outer cutting surface,
    the minimum distance between the first outer cutting surface and the first plane inner wall is a first distance, the minimum distance between the second outer cutting surface and the second plane inner wall is a second distance,
    SD represents a smaller one of the first distance and the second distance, and
    $D_t$ is the distance between the first outer cutting surface and the second outer cutting surface.

2. The supporting element according to claim 1, wherein the first plane inner wall and the second plane inner wall of the inner-side connecting surface are inclined with respect to the object-side mechanical surface.

3. The supporting element according to claim 1, wherein at least one of the image-side mechanical surface and the object-side mechanical surface has a stepped structure.

4. The supporting element according to claim 3, wherein a height difference of a step of the stepped structure is 0.020 mm or more.

5. The supporting element according to claim 1, wherein the inner-side connecting surface has the first plane inner wall and the second plane inner wall extending from the image-side mechanical surface.

6. The supporting element according to claim 1, wherein the outer-side connecting surface further has at least one third outer cutting surface, wherein the third outer cutting surface is located on one side of the first outer cutting surface and the second outer cutting surface.

7. The supporting element according to claim 1, wherein tops of the image-side mechanical surface and the object-side mechanical surface are planar.

8. The supporting element according to claim 1, wherein the supporting element further satisfies the following conditional expression:

$$D_{omax}/D_t<0.900,$$

wherein the inner-side connecting surface defines a light passing hole for allowing an imaging ray to pass, an opening of the light passing hole toward the object side is an object-side light passing opening, and $D_{omax}$ is the maximum diameter of the object-side light passing opening.

9. The supporting element according to claim 1, wherein the supporting element further satisfies the following conditional expression:

$$D_{omax}/D_{td}<0.850,$$

wherein the inner-side connecting surface defines a light passing hole for allowing an imaging ray to pass, an opening of the light passing hole toward the object side is an object-side light passing opening, $D_{omax}$ is the maximum diameter of the object-side light passing opening, and $D_{td}$ is the maximum diameter of the outer-side connecting surface.

10. A portable optical imaging lens, comprising:
a lens barrel;

a plurality of lens elements having refracting power, sequentially arranged along an optical axis from an object side to an image side and disposed in the lens barrel; and a supporting element disposed in the lens barrel and comprising:

an object-side mechanical surface facing toward the object side;

an image-side mechanical surface facing toward the image side;

an inner-side connecting surface; and an outer-side connecting surface, wherein the inner-side connecting surface and the outer-side connecting surface connect the image-side mechanical surface and the object-side mechanical surface and respectively face toward an inside and an outside of the supporting element, and at least one of the object-side mechanical surface and the image-side mechanical surface is configured to support at least one of the lens elements, wherein the inner-side connecting surface has a first plane inner wall and a second plane inner wall extending from at least one mechanical surface of the object-side mechanical surface and the image-side mechanical surface, and the first plane inner wall is opposite to the second plane inner wall, wherein the outer-side connecting surface has a first outer cutting surface and a second outer cutting surface opposite to each other, the first outer cutting surface is adjacent to the first plane inner wall, and the second outer cutting surface is adjacent to the second plane inner wall, wherein the supporting element further satisfies the following conditional expressions:

$4.000 \leq R/SD \leq 30.000$ and $4.000 \text{ mm} \leq D_t \leq 8.000 \text{ mm}$, wherein R represents half of a distance between the first outer cutting surface and the second outer cutting surface, the minimum distance between the first outer cutting surface and the first plane inner wall is a first distance, the minimum distance between the second outer cutting surface and the second plane inner wall is a second distance, SD represents a smaller one of the first distance and the second distance, and $D_t$ is the distance between the first outer cutting surface and the second outer cutting surface.

11. The portable optical imaging lens according to claim 10, wherein the first plane inner wall and the second plane inner wall of the inner-side connecting surface are inclined with respect to the object-side mechanical surface.

12. The portable optical imaging lens according to claim 10, wherein at least one of the image-side mechanical surface and the object-side mechanical surface has a stepped structure.

13. The portable optical imaging lens according to claim 12, wherein a height difference of a step of the stepped structure is 0.020 mm or more.

14. The portable optical imaging lens according to claim 10, wherein the inner-side connecting surface has the first plane inner wall and the second plane inner wall extending from the image-side mechanical surface.

15. The portable optical imaging lens according to claim 10, wherein the outer-side connecting surface further has at least one third outer cutting surface, wherein the third outer cutting surface is located on one side of the first outer cutting surface and the second outer cutting surface.

16. The portable optical imaging lens according to claim 10, wherein tops of the image-side mechanical surface and the object-side mechanical surface are planar.

17. The portable optical imaging lens according to claim 10, wherein the supporting element further satisfies the following conditional expression:

$D_{omax}/D_t < 0.900$, wherein the inner-side connecting surface defines a light passing hole for allowing an imaging ray to pass, an opening of the light passing hole toward the object side is an object-side light passing opening, and $D_{omax}$ is the maximum diameter of the object-side light passing opening.

18. The portable optical imaging lens according to claim 10, wherein the supporting element further satisfies the following conditional expression:

$D_{omax}/D_{id} < 0.850$, wherein the inner-side connecting surface defines a light passing hole for allowing an imaging ray to pass, an opening of the light passing hole toward the object side is an object-side light passing opening, $D_{omax}$ is the maximum diameter of the object-side light passing opening, and $D_{id}$ is the maximum diameter of the outer-side connecting surface.

* * * * *